US007867936B2

(12) United States Patent
Solsky et al.

(10) Patent No.: US 7,867,936 B2
(45) Date of Patent: Jan. 11, 2011

(54) PROCESS FOR PASSIVATING POROUS CERAMIC ARTICLES AND AN ARTICLE MADE THEREFROM

(75) Inventors: Corey Beth Solsky, Corning, NY (US); David Lambie Tennent, Campbell, NY (US); Bin Wen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 664 days.

(21) Appl. No.: 11/998,226

(22) Filed: Nov. 29, 2007

(65) Prior Publication Data

US 2009/0142540 A1 Jun. 4, 2009

(51) Int. Cl.
  *B01J 38/72* (2006.01)
(52) U.S. Cl. .......................................... 502/22; 502/439
(58) Field of Classification Search .................. 502/22, 502/439
  See application file for complete search history.

(56) References Cited

U.S. PATENT DOCUMENTS

| 3,565,830 | A | 2/1971 | Keith et al. ................. 252/466 |
| 5,346,722 | A | 9/1994 | Beauseigneur et al. ...... 427/300 |
| 7,122,612 | B2 | 10/2006 | Tao et al. ................. 526/317.1 |
| 7,132,150 | B2 | 11/2006 | Ogunwumi ................. 428/117 |
| 7,166,555 | B2 | 1/2007 | Shustack et al. ............ 502/159 |
| 2001/0006717 | A1 | 7/2001 | Domesle et al. ............. 428/116 |
| 2006/0154816 | A1 | 7/2006 | Domesle et al. ............. 502/439 |

FOREIGN PATENT DOCUMENTS

WO 2005/018790 3/2005

*Primary Examiner*—Edward M Johnson
(74) *Attorney, Agent, or Firm*—John L. Haack

(57) ABSTRACT

A method for passivating a porous ceramic article containing microcracks including filling the microcracks with a liquid, such as water, and then applying a washcoat as described herein.

12 Claims, 1 Drawing Sheet

PROCESS FOR PASSIVATING POROUS CERAMIC ARTICLES AND AN ARTICLE MADE THEREFROM

BACKGROUND

The disclosure relates to a method of passivating a porous ceramic article having microcracks and an article made therefrom. More particularly, the disclosed method preserves the coefficient of thermal expansion of a porous ceramic article after application of a washcoat.

SUMMARY

The disclosure provides a method to passivate porous ceramic articles containing microcracks. The method protects microcracks from being filled during processing of the porous ceramic article and can maintain the coefficient of thermal expansion of the article. In embodiments, the method includes: contacting the porous ceramic article with a liquid consisting essentially of water until the liquid comprises from about 2 to about 15 wt. % of the porous ceramic article; and applying a washcoat to the contacted porous ceramic article, the washcoat comprising a carrier fluid.

DETAILED DESCRIPTION

Figure 1:
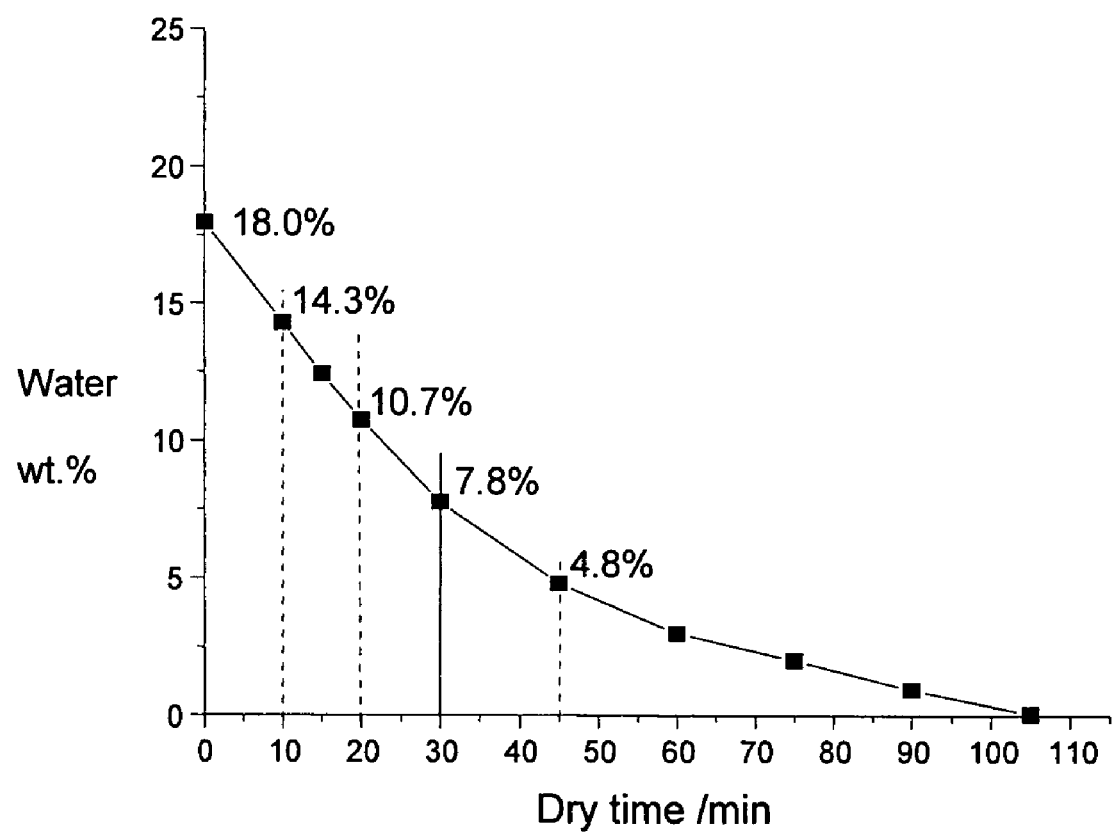
FIG. 1 shows a graph of weight percent water in the porous ceramic article versus drying time at 80° C.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments for the claimed invention.

The indefinite article "a" or "an" and its corresponding definite article "the" as used herein means at least one, or one or more, unless specified otherwise.

"Include," "includes," or like terms means including but not limited to.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example, through typical measuring and manipulation procedures; through inadvertent error in these procedures; through differences in the manufacture, source, or purity of starting materials or ingredients used to carry out the methods; and like considerations. The term "about" also encompasses amounts that differ due to, for example, aging of a formulation having a particular initial concentration, mixture, topography, or morphology, and amounts that differ due to processing a formulation with a particular initial concentration, mixture, topography, or morphology. Whether modified by the term "about" the claims appended hereto include equivalents to these quantities.

"Optional" or "optionally" or like terms generally refer to, for example, that the subsequently described event or circumstance can or cannot occur, and that the description includes instances where the event or circumstance occurs and instances where it does not.

"Consisting essentially of" in embodiments refers, for example, a method of passivating a porous ceramic article comprising microcracks as defined herein, and can include the components or steps listed in the claim, plus other components or steps that do not materially affect the basic and novel properties of the composition, article, apparatus, system, and method of making and use of the disclosure, such as a particular reactant, a particular additive or ingredient, a particular agent, a particular surface modifier or condition, or like structure, material, process, or computational variable selected.

The disclosure includes a method to passivate a porous ceramic article having microcracks. The porous ceramic article selected for passivation should permit introduction of a liquid through the article and preferably also through the walls of the article. The article may be, for example, a catalyst support, a filter such as diesel particulate filter, and like articles or devices, or combinations thereof. The liquid can consist essentially of water.

The coefficient of thermal expansion (CTE) affects an article's resistance to thermal shock. An article with a lower CTE tends to have greater resistance to thermal shock than a similar article with a higher CTE. Microcracks can reduce the CTE of ceramic articles. Microcracks are intentionally introduced into the article and act as expansion joints thereby reducing the CTE and improving thermal shock resistance of the article. The dimensions of microcracks are typically from about 0.1 to about 0.4 μm wide and from about 30 to about 300 μm long. Microcracks tend to be very stable and also tend not to change dimensions over many thermal cycles. Unfortunately, processing can fill the microcracks and prevent the article from expanding into the microcrack. The CTE of the article therefore increases.

Porous ceramic articles having microcracks may be used as catalyst supports in various applications. The catalyst is often applied as a washcoat, which is typically a suspension comprising the catalyst in a liquid. Particles in the washcoat can enter the microcracks and prevent the microcracks from closing during heating. This increases the CTE of the article and decreases thermal shock resistance. Passivation techniques preserve microcracks during application of a washcoat so that the microcracks can function as expansion joints when the article is heated. Passivation can occur, for example, by dipping the porous ceramic article into a solution comprising a soluble polymer, blowing out the excess solution, and thermally drying to evaporate the solution. In embodiments, the polymer can be, for example, an organic compound, such as methylcellulose. Alternatively, the polymer may be polymer precursors, such as monomers or oligomers, which precursors can react to form the polymer in situ. The polymer may even comprise a crosslinkable element. The washcoat may be applied to the porous ceramic article after the solution. The porous ceramic article can then be dried and calcined. Calcination includes heating the article to volatilize the polymer or like additives and ideally leaves the microcracks empty; however, since volatilization of polymer can produce noxious gases and harmful emissions the polymer or additives if employed in the process are carefully selected to avoid or minimize any adverse emissions. Additionally, volatilization can be incomplete so that residual polymer remains in the microcracks.

Instead of a polymer, the article can be pre-coated with an aqueous buffer solution and later coated with a slurry comprising a gel-forming agent. The buffer solution fills the microcracks, and consists essentially of water and a buffering agent. The slurry gels on contact with the buffer solution, thereby creating plugs over the microcracks. Calcining removes water from the buffer solution and leaves essentially empty microcracks. The buffer solution is selected to match the particular gel-forming agent. An example of a buffer solution/slurry pair includes: a pH 7 buffer solution comprising water, monobasic potassium phosphate, and sodium hydroxide; and a pH 3 slurry of alumina. The pre-coat may even comprise a liquid vehicle, such as water, and a water-soluble, thermally cross-linkable, thermally pyrolyzable, hydrocarbon polymer. The pre-coat is applied to the article and dried to remove the liquid vehicle. The polymer can crosslink during drying.

In all of the above techniques, a material is applied to the microcracks and is removed by heating the porous ceramic article, typically in an oxidizing atmosphere, until the material volatilizes. Volatilization includes oxidation to gaseous compounds, degradation into gaseous components, sublimation, and evaporation. Unfortunately, volatilization is not always complete and some residual material may remain in the microcracks. Any material remaining in the microcracks can prevent the microcrack from functioning as an expansion joint. Residual material in the microcracks can, therefore, increase the CTE. Such residue producing techniques often use costly materials and processes to passivate a porous ceramic article containing microcracks. The material processing also tends to release noxious or toxic gases.

The method of the disclosure includes coating the porous ceramic article with a liquid consisting essentially of water. The amount of the liquid in the porous ceramic article can comprise from about 2 to about 15 wt. % of the total mass of the coated article. After the article has been coated it can be stored, preferably at a controlled humidity so that the liquid does not evaporate from the porous ceramic article and that excess liquid is not absorbed by the porous ceramic article.

In embodiments, coating includes applying an excess of the liquid to the porous ceramic article and removing the excess of the liquid from the porous ceramic article until the liquid accounts for from about 2 to about 15 wt % of the coated porous ceramic article, and preferably from about 4 to about 8 wt. % of the coated porous ceramic article. The excess of the liquid can be applied by any known methods, including for example, immersion, spraying, aerosol, misting, fogging, atomization, humidification, and like methods, or combinations thereof. An aerosol includes a suspension of particles, and may include a mist, a fog, or atomized particles. An aerosol typically includes, for example, about 5 wt. % of the liquid suspended in a gas. The gas may include air, an inert gas, a flammable gas, or even the vapor phase of the liquid component. A mist or fog includes liquid droplets, for example, of less than about 50 microns suspended in a fluid. Misting includes directing a mist containing droplets of the liquid to the article. The mist may include up to 100 wt. % of the liquid. Humidification includes placing the porous ceramic article in an environment at a saturated humidity and typically at temperatures above about 25° C. Removal of the excess liquid can include, for example, blowing out the excess liquid from the porous ceramic article or using heat or a desiccant on the porous ceramic article. Removing the excess liquid can occur, for example, at temperatures above about 50° C., preferably above about 70° C., and more preferably above about 90° C. Humidity below, for example, about 50% facilitates drying.

In embodiments of the passivation method, liquid water soaks into the microcracks so that particles in the washcoat are substantially prevented from entering the microcracks. The water is easily volatilized, leaves no residue, and produces no harmful emissions. In embodiments, the liquid may be introduced to the porous ceramic article by any convenient method including, for example, by immersion, misting, fogging, atomization, aerosol, or like methods, and combinations thereof. The amount of liquid in the porous ceramic article can be maintained, for example, between from about 2 to about 15 wt. %. The use of too little liquid fails to protect the microcracks and too much liquid prevents the washcoat from fixing in sufficient quantity to the porous ceramic article.

Optionally, the method includes applying a washcoat to the porous ceramic article. The washcoat can include a surface-active compound to be fixed to the porous ceramic article. The washcoat typically comprises, for example, a surface-active compound suspended in a carrier fluid; although, a washcoat may include, for example, a spray-dried, atomized, or fluidized surface-active compound. The surface-active compound generally comprises a catalyst, such as a zeolite or heavy metal element or compound. The porous ceramic article can then be calcined. Calcining typically occurs at temperatures of at least about 500° C.

If the washcoat includes a carrier fluid, drying can be accomplished, for example, after applying the washcoat to the porous ceramic article and before calcining. Drying means removing a sufficient amount of liquid and carrier fluid so that cracking substantially decreases during calcining of the porous ceramic article. Excess carrier fluid or liquid are preferably avoided because they can undergo explosive volatilization during calcining. For example, after coating the porous ceramic article with the liquid and then immersing in a washcoat suspension, approximately ninety percent of washcoat was removed during drying to avoid cracking at the high calcining temperatures. Calcining can last, for example, at least about two hours.

The disclosure includes a passivated porous ceramic article having microcracks. The microcracks are capable of functioning as expansion joints, thereby maintaining a CTE of less than about $15 \times 10^{-7}/°$ C. The passivated article can be produced, for example, by a method comprising coating a porous ceramic article with a liquid consisting essentially of water until the liquid comprises from about 2 to about 15 wt. % of the porous ceramic article, applying a washcoat to the porous ceramic article, and calcining the porous ceramic article at more than about 500° C. for more than about 2 hours. If the washcoat includes a carrier fluid, the porous ceramic article can be dried after application of the washcoat and before calcining. Drying includes removing at least about 90% of the carrier fluid from the porous ceramic article. The passivated porous ceramic article can comprise a catalyst support or a filter. Optionally, the passivated porous ceramic article can include a honeycomb structure.

In embodiments, the passivated porous ceramic article can be made by a method comprising coating the porous ceramic article with a liquid such as water until the liquid comprises from about 2 to about 15 wt. % of the coated porous ceramic article. A washcoat can be applied to the coated porous ceramic article. The washcoat can include, for example, a suspension comprising a surface-active compound and a carrier fluid, and can preferably be applied at greater than about 50 gram/liter. Drying can then be performed to remove at least about 90% of the carrier fluid from the porous ceramic article. The dried article can be calcined at more than about 500° C. for more than about 2 hours.

In embodiments, the porous ceramic article comprises a diesel particulate filter that is coated by immersion in water. Excess water can be removed so that the water comprises about 10 wt. % of either the total weight or the superaddition weight of the coated filter. A washcoat comprising a catalyst suspended in water can be applied to the coated filter and the filter can be dried at 90° C. for 45 minutes until water is about 12 wt. % of the filter. The filter can be calcined at about 550° C. for about 2 hours to produce the passivated article of the disclosure. The passivation method is relatively low cost, the passivating liquid can be volatilized completely, and the method produces no noxious or toxic gases. Thus, the method uses inexpensive materials and can avoid or minimize emissions.

EXAMPLES

The following examples serve to more fully describe the manner of using the above-described disclosure, and further set forth best modes contemplated for carrying out various aspects of the disclosure. These examples do not limit the true scope of this disclosure, but rather are presented for illustrative purposes.

Example 1

Five diesel particulate filters were prepared, Filters A to E. No liquid or washcoat was applied to Filter A and remained in an as-fired condition, which represented a neat control. A washcoat was applied to Filter B without first coating the filter with liquid. Filter B was a washcoat control. Filters C to E were coated with a liquid consisting essentially of water. Excess liquid was removed from the filters by drying. Filter C to E were distinguished by the amount of time spent to remove liquid from the filter before application of the washcoat. Filters C to E were dried at about 90° C. for 45, 75 and 90 minutes, respectively. A washcoat suspension was then applied to Filters C to E. Filters A to E were calcined at 550° C. for 2 hours. Table 1 shows surprising result of the mechanical properties of the calcined filters. CTE from room temperature to 800° C. was actually lower for Filters C to E than for Filter A or Filter B. Tests indicate that EMOD and SP/MOR may be the same or even enhanced by the inventive process. The modulus of rupture (MOR) was roughly equal for all filters. MOR was determined by standard ASTM procedures. The results suggest Filters C to E have superior thermal shock resistance than Filter B and could be equal to or better than Filter A.

TABLE 1

| Filter | Coating | Washcoat loading (g/L) | CTE RT 800° C. ($10^{-7}$/° C.) | Strain $\Delta L/L_{500-900}$ (ppm) | MOR RT (psi) |
|---|---|---|---|---|---|
| A | Uncoated | 0 | 7.0 | 542 | 381 |
| B | Coated | 33 | 7.4 | 567 | 426 |
| C | Coated | 23 | 3.2 | 421 | 433 |
| D | Coated | 26 | 2.0 | 374 | 375 |
| E | Coated | 32 | 3.1 | 410 | 407 |

Example 2

A substrate was provided having dimensions 5.66 inches (11.84 centimeters) in diameter and 6 inches (15.24 centimeters) in length. The substrate had a cell density of 400 cpsi, a wall thickness of 6.5 mil, and microcracks having dimensions from about 0.1 to about 0.4 µm wide and from about 30 to about 300 µm long. Samples F to J were core drilled from the substrate to a dimension of 2 inches (5.08 centimeters) in diameter and 6 inches (15.24 centimeters) long. Samples F to J were weighed. Samples H to J were immersed in deionized water at room temperature. After immersion, excess water was blown-off by high pressure air and the samples were dried in a forced air oven at 80° C. for periods of time. Samples H to J were weighed again to determine the amount of water left in the filter. A washcoat slurry was made by mixing a P-zeolite with water. The slurry had a solids content of about 50 wt. % and a pH of about 3.8. Samples H to J were coated with the washcoat using a vacuum to pull the slurry up through the substrate, and were oven dried at 100° C. overnight. Samples G to J were calcined at about 550° C. for about 5 hours. Sample F was a filter in an as-fired state having no water or washcoat.

Table 2 shows that the amount of water remaining in a sample prior to immersion in the slurry was a significant factor for achieving proper washcoat loading. Washcoat loadings of greater than about 85 g/L are typically preferred. Sample H had more than about 14 wt. % residual water and a low washcoat loading of about 47 g/L was obtained. Sample I had slightly less water and more washcoat, about 70 g/L, was retained. Alternatively, without sufficient water, Sample H had a low washcoat loading because the washcoat could not be coated completely. Although not limited by theory, it is believed that the absence of water in the microcracks caused water in the slurry to be drawn rapidly into the microcracks resulting in a non-uniform coating of the washcoat. Samples J and K with coatings in the range of about 4 to about 8 wt. % produced uniform coating with good washcoat loading. Interestingly, Samples J and K also had CTE significantly lower CTE than either Samples F or G. The elastic modulus, EMOD, was substantially the same for all samples.

TABLE 2

| Sample | Drying time (min) | Water in Sample (wt. %) | Coating level (g/L) | $CTE_{25-800\,C.}$ ($10^{-7}$/° C.) |
|---|---|---|---|---|
| F | NA | 0 | NA | 11.0 |
| G | NA | 0 | 81 | 11.1 |
| H | 10 | 14.3 | 47 | 4.6 |
| I | 20 | 10.7 | 70 | 7.2 |
| J | 30 | 7.8 | 102 | 5.3 |
| K | 45 | 4.8 | 98 | 4.5 |

The amount water in the samples as a function of drying time is given in FIG. 1. Immediately after immersion, the sample had about 18 wt. % water. Drying at 80° C. in a forced air oven steadily decreased the amount of water in the sample. Extrapolation suggested that a sample would be fully dry in about 110 minutes. Under these conditions, optimum drying occurs when the water content is between from about 4 to about 8 wt. % or drying times of from about 30 minutes to about 50 minutes.

The disclosure has been described with reference to various specific embodiments and techniques. However, many variations and modifications are possible while remaining within the spirit and scope of the disclosure.

The invention claimed is:

1. A method for passivating a porous ceramic article having microcracks, the method comprising:
    contacting the porous ceramic article with a liquid consisting essentially of water until the liquid comprises from about 2 to about 15 wt. % of the porous ceramic article; and
    applying a washcoat to the contacted porous ceramic article, the washcoat comprising a carrier fluid.

2. The method of claim 1, further comprising:
    drying the porous ceramic article to remove at least 90% of the liquid and the carrier fluid from the porous ceramic article.

3. The method of claim 2, further comprising heating the porous ceramic article to calcine the washcoat.

4. The method of claim 1, wherein the contacting the porous ceramic article with the liquid comprises applying an excess of the liquid to the porous ceramic article and thereafter removing the excess of the liquid from the porous ceramic article by drying.

5. The method of claim 2, wherein the drying includes heating the porous ceramic article to a temperature of at least 50° C.

6. The method of claim 1, wherein the contacting comprises immersing the porous ceramic article in the liquid and blowing-out an excess of the liquid from the porous ceramic article.

7. The method of claim 1, wherein the contacting comprises providing a mist including the liquid, and directing the mist through the porous ceramic article.

8. The method of claim 7, wherein the mist comprises from about 5 to about 100 wt. % of the liquid.

9. The method of claim 1, wherein the contacting comprises atomizing the liquid to produce an aerosol and directing the aerosol through the porous ceramic article.

10. The method of claim 1, wherein the contacting comprises spraying the porous ceramic article with the liquid.

11. The method of claim 1, wherein the washcoat comprises a slurry, and applying the washcoat includes immersing the porous ceramic article in the slurry.

12. The method of claim 1, wherein the applying the washcoat to the porous ceramic article includes spraying the washcoat onto the porous ceramic article.

* * * * *